(12) United States Patent
Kohashi et al.

(10) Patent No.: US 7,201,038 B2
(45) Date of Patent: Apr. 10, 2007

(54) KNOCK SENSOR AND MANUFACTURING METHOD THEREOF

(75) Inventors: Masao Kohashi, Tokyo (JP); Akito Yokoi, Tokyo (JP); Yoichiro Takahashi, Hyogo (JP); Yoshiyuki Sawada, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/098,416

(22) Filed: Apr. 5, 2005

(65) Prior Publication Data

US 2006/0081034 A1 Apr. 20, 2006

(30) Foreign Application Priority Data

Oct. 15, 2004 (JP) ............................. P2004-301484

(51) Int. Cl.
*G01L 23/22* (2006.01)
(52) U.S. Cl. ..................................... 73/35.11; 310/329
(58) Field of Classification Search ............... 73/35.07, 73/35.09, 35.11, 117.2, 117.3, 35.01, 35.12, 73/35.13; 310/329
See application file for complete search history.

(56) References Cited

U.S. PATENT DOCUMENTS

| | | | | |
|---|---|---|---|---|
| 5,150,606 A | * | 9/1992 | Komurasaki | ............... 73/35.09 |
| 5,398,540 A | * | 3/1995 | Entenmann et al. | ........ 73/35.11 |
| 5,798,453 A | * | 8/1998 | Brammer et al. | .......... 73/35.09 |
| 5,939,616 A | * | 8/1999 | Ito et al. | ..................... 73/35.11 |
| 6,220,078 B1 | * | 4/2001 | Brammer et al. | .......... 73/35.11 |
| 6,776,026 B1 | * | 8/2004 | Barron | ....................... 73/35.11 |
| 6,868,714 B2 | * | 3/2005 | Mueller et al. | ............. 73/35.11 |

FOREIGN PATENT DOCUMENTS

| | | |
|---|---|---|
| DE | 19524152 C1 | 5/1996 |
| DE | 19829379 A1 | 1/2000 |
| DE | 10044483 A1 | 7/2001 |
| DE | 10044476 A1 | 4/2002 |
| DE | 102004054763 A1 | 11/2005 |
| JP | 2002-257624 | 11/2005 |

* cited by examiner

*Primary Examiner*—Helen Kwok
(74) *Attorney, Agent, or Firm*—Sughrue Mion, PLLC

(57) ABSTRACT

A knock sensor is constructed by putting and fitting components including an annular piezoelectric element, terminal plate, insulating sheet and weight onto a base consisting of a flange portion and a tubular portion, forming a groove part on a tip outer circumferential surface of the tubular portion, fitting a stopper ring functioning to apply an axial preload to the components onto the tubular portion, and caulking fixedly the stopper ring and the tubular portion into the groove part.

20 Claims, 3 Drawing Sheets

KNOCK SENSOR AND MANUFACTURING METHOD THEREOF

BACKGROUND OF THE INVENTION

1. Field of the Invention

The present invention relates to a non-resonant type knock sensor that is mounted on an internal combustion engine.

The invention also relates to a manufacturing method of such a knock sensor.

2. Description of the Related Art

A non-resonant type knock sensor mounted on an internal combustion engine is constituted so as to convert knocking vibration into voltage signals with a piezoelectric element sandwiched and press-held in an internal part of the internal combustion engine, and output the voltage signals as output signals when the knocking vibration takes place in the internal combustion engine. This type of knock sensor is well known by the Japanese Patent Publication (unexamined) No. 257624/2002, for example. FIG. 6 is a cross sectional view showing an internal structure of the knock sensor shown in the above publication. This knock sensor 40 is constituted as follows. A metal base 21 consists of a disk-shaped flange portion 21a and a tubular portion 21b axially extending from this flange portion 21a, and includes a through hole 22 provided through both of the mentioned flange portion 21a and tubular portion 21b. Onto this metal base 21, a lower-side insulating sheet 7, a lower-side terminal plate 5, a piezoelectric element 4, an upper-side terminal plate 6, an upper-side insulating sheet 8, and a weight 9 are put and fitted in sequence from the bottom. Next, a nut 23 is screw-engaged with a male thread part 21c that is formed on the outer circumferential surface of a tip end of the mentioned tubular portion 21b, and the mentioned components are fastened with a predetermined torque using a tool such as torque wrench fastening head. Thereafter, a terminal part 14 is joined to the lower-side terminal plate 5 and the upper-side terminal plate 6 by soldering or resistance welding, and the resultant structure other than an inner circumferential surface and two end faces of the mentioned tubular portion 21b of the base 21 is covered with a resin mold to form a case 13. Whereas, a connector part 15 for fetching out signals is formed protruding from one side face of the case 13 and is simultaneously molded with the terminal part 14 as an integral part.

This type of knock sensor is mounted on the internal combustion engine with a bolt to be inserted into the through hole provided in axial direction of the base. When knocking vibration takes place at the internal combustion engine, the components such as piezoelectric element, weight, etc. forming the knock sensor vibrate together with the knocking vibration, this vibration is converted into voltage signals with the piezoelectric element, and the detected signals are outputted to outside via the lower-side terminal plate and the upper-side terminal plate. Accordingly, it is necessary for all the components to be firmly pressed with a predetermined mechanical preload, as well as to be kept in this state at the time of occurrence of acceleration due to knocking of the internal combustion engine. Any change in preload causes output characteristics or detection sensitivity of a piezoelectric element to vary, thus making it hard to execute knocking detection.

Moreover, in the conventional knock sensor 40 constructed as described above, since the components such as the insulating sheets 7, 8, terminal plates 5, 6, piezoelectric element 4, and weight 9 that are stacked on the base 21 are sandwiched and pressed by clamping with the nut 23, there are problems as described below.

That is to say, although clamping with the nut 23 intends to provide a predetermined preload to the piezoelectric element 4, controlling a torque with a tool such as torque wrench fastening head, a problem exists in that a preload to be exerted on the piezoelectric element 4 is not stable due to fluctuations in clamping torque of the nut 23 or coefficient of friction or dimension between the female screw part of the nut 23 and the male thread part 21c formed on the base 21. This unstable preload causes fluctuations in output characteristics and detection sensitivity at the time of knocking detection. Furthermore, it is sometimes the case that metal chips are produced during machining a screw such as screw thread cutting, and the chips having been caught on the screw part drop and get in between electrodes of the piezoelectric element 4 at the time of sensor assembling or at the time of resin molding of the case 13 to bring the electrodes in short circuit eventually resulting in the disorder of the sensor.

Moreover, due to the fact that the nut 23 is used or that the male thread part 21c is formed on the base 21, not only a high production cost is required, but also it is necessary to pay attention to the control of a clamping torque of the nut 23 or the screw-engagement between the nut 23 and base 21. As a result, the conventional knock sensor has a further problem of making it difficult to achieve the automated assembling of a sensor.

SUMMARY OF THE INVENTION

An object of the present invention is to solve the above-discussed problems incidental to the prior art.

The second object of the invention is to provide a knock sensor and a manufacturing method thereof, in which a predetermined preload is applied with accuracy to a piezoelectric element to make output characteristics or detection sensitivity stable.

The third object of the invention is to provide a knock sensor and a manufacturing method thereof, in which short circuit fault caused by the above-described metal chips is eliminated.

The fourth object of the invention is to provide a knock sensor and a manufacturing method thereof which can be manufactured at low cost owing to cost reduction of parts and easier assembling.

A knock sensor according to the first aspect of the invention includes: a metal base consisting of a disk-shaped flange portion and a tubular portion extending axially from the flange portion, and provided with a through hole running through both of the mentioned flange portion and tubular portion; an annular piezoelectric element, terminal plate, insulating sheet, and weight that are fitted onto the tubular portion of the mentioned base; and holding means for holding the mentioned components sandwiched and pressed between the holding means and the mentioned flange portion. In this knock sensor, the mentioned holding means is provided with a groove part on a tip outer circumferential surface of the mentioned tubular portion; and a stopper ring acting to apply an axial preload to the mentioned components is put and fitted onto the mentioned tubular portion; and the mentioned stopper ring and the mentioned tubular portion are fixedly caulked into the mentioned groove part.

A manufacturing method of a knock sensor according to the second aspect of the invention includes the steps of: fitting in sequence an annular piezoelectric element, terminal plate, insulating sheet, and weight onto a base having a flange portion and a tubular portion; pressing downward the mentioned stopper ring while applying an external load in axial direction; controlling positions of pressing downward to cause the mentioned stopper ring to stop at a predetermined position; caulking the mentioned stopper ring and the mentioned tubular portion into a groove part formed on a tip outer circumferential surface of the mentioned tubular portion in a state that the mentioned stopper ring presses the mentioned components to the mentioned flange portion; and holding the mentioned components sandwiched and pressed between the mentioned stopper ring and the mentioned flange portion.

The knock sensor according to the first aspect of the invention is constructed such that an external load is applied axially to the stopper ring and the components such as piezoelectric element or weight can be pressed to the flange portion, and furthermore the stopper ring can be fixedly caulked into the tubular portion in such a state. As a result, supposing that positions of the stopper ring being pressed are controlled while pressing it downward in axial direction, it is possible to adjust with accuracy a preload to be applied to the mentioned components; and it is further possible that the stopper ring and tubular portion are fixedly caulked in the state of this preload being applied. Consequently, it is possible to give with accuracy a predetermined preload to a piezo electric element to make output characteristics and detection sensitivity stable. Further, since there is no screw thread on a nut or base, metal chips prone to be a cause of short circuit of a sensor are not produced. Furthermore, the use of nuts or the screw threading the tip end of the base tubular portion comes to be unnecessary, thus enabling to achieve reduced cost of parts.

In the manufacturing method according to the second aspect of the invention, the stopper ring is pressed downward while applying an external load in axial direction; and a load during pressing downward are measured, and a position at which the stopper ring is to be stopped is controlled. As a result, it comes to be possible to adjust with accuracy a preload to be applied to components such as piezoelectric element or weight. Further, since the stopper ring and tubular portion are fixedly caulked in the state that a preload is applied to the components, the components are sandwiched and pressed with a predetermined preload between the stopper ring and the flange portion even after an axially external load has been eliminated, thereby enabling to make output characteristics or detection sensitivity stable. Furthermore, according to the manufacturing method of the invention, it is unnecessary to pay any attention to the control of clamping torque of the nut or screw-engagement between the nut and base, thus enabling to simplify the assembling and adjustment of a sensor and making it easy to be automated.

DETAILED DESCRIPTION OF THE INVENTION

Embodiment 1

Figure 1:
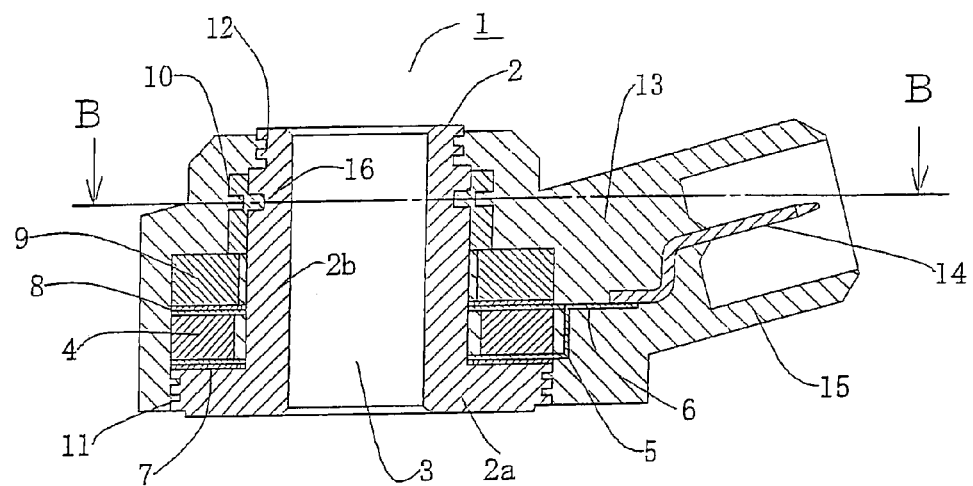
FIG. 1 is a cross sectional view of a knock sensor 1 showing a first preferred embodiment of the present invention.

Hereinafter, several preferred embodiments according to the present invention are described with reference to the drawings. In addition, the same reference numerals indicate the same or like parts to the aforementioned prior art, and further descriptions thereof are omitted.

FIG. 1 is a cross sectional view showing an internal structure of a knock sensor 1 being a first embodiment according to the invention. Reference numeral 1 designates a knock sensor, all components of which are covered with a case 13 made of synthetic resin (for example, nylon 66). A connector portion 15 that connects a connector from an ignition timing control device (not shown) is formed at the mentioned case 13.

Numeral 2 designates a base of the knock sensor 1. This base 2 consists of a disk-shaped flange portion 2a and a tubular portion 2b axially extending from this flange portion 2a, and is provided with a through hole 3 running through both of the mentioned flange portion 2a and tubular portion 2b. A plurality of engagement grooves 11, 12 are formed on the outer circumferential surface of the mentioned flange portion 2a and on a tip outer circumferential surface of the tubular portion 2b, and make it sure to engage with the case 13 and to prevent the penetration of water from outside. Further, a groove part 16 going round the outer circumferential surface of the mentioned tubular portion 2b is formed below the mentioned engagement groove 12 at the tip end portion of the mentioned tubular portion 2b.

Numeral 4 designates an annular piezoelectric element, which is fitted onto the mentioned tubular portion 2b, and outputs axial vibration that is transmitted via the base as voltage signals.

Numeral 5 designates a lower-side terminal plate made of a conductive metal plate, which is in contact with the bottom of the mentioned piezoelectric element 4 in the sate of being fitted onto the mentioned tubular portion 2b of the base 2. Further, numeral 6 designates an upper-side terminal plate likewise made of a conductive metal plate, which is in contact with the top of the piezoelectric element 4 in the state of being fitted onto the mentioned tubular portion 2b of the base 2. Numeral 14 designates a terminal part welded to the mentioned lower-side terminal plate 5 and the mentioned upper-side terminal plate 6, and this terminal part 14 forms an electric terminal of the connector portion 15.

Numeral 7 designates an annular lower-side insulating sheet made of a thin plate of insulating resin. This lower-side insulating sheet 7 is fitted onto the mentioned tubular portion 2b of the base 2, and located on the lower side of the mentioned lower-side terminal plate 5 to provide electrical isolation between the mentioned lower-side terminal plate 5 and the mentioned flange portion 2a of the base 2. Numeral 8 designates an annular upper-side insulating sheet made of a thin plate of insulating resin. This upper-side insulating sheet 8 is fitted onto the mentioned tubular portion 2b of the base 2, and located on the upper side of the mentioned upper-side terminal plate 6 to provide electrical isolation between the mentioned upper-side terminal plate 6 and the later-described weight 9.

Numeral 9 designates an annular weight functioning to provide a vibration force to the mention piezoelectric element 4, and this weight 9 is fitted onto the mentioned tubular portion 2b of the base 2 and located on the top of the mentioned upper-side insulating sheet B.

Numeral 10 designates a stopper ring, which is fitted onto the mentioned tubular portion 2b and fixedly caulked into the groove part 16 that is formed in the tip end portion of the mentioned tubular portion 2b in the state that the lower-side insulating sheet 7, the lower-side terminal plate 5, the piezoelectric element 4, the upper-side terminal plate 6, the upper-side insulating sheet 8 and the weight 9 each likewise fitted onto the mentioned tubular portion 2b are sandwiched and pressed between this stopper ring 10 and the mentioned flange portion 2a. As shown in FIG. 1, the stopper ring 10 is formed such that it has a portion that is recessed into the groove part 16. the portion of the stopper ring 10 in the groove part 16 has an outer diameter which is less than an outer diameter of the stopper ring 10 at an area above or below the portion recessed into groove part 16.

As described above, the knock sensor according to the first embodiment is constructed such that an external load can be directly applied to the stopper ring in axial direction, and the stopper ring can be fixedly caulked into the tubular portion in such a state.

Accordingly, supposing that positions of the stopper ring are controlled while pressing downward the stopper ring in axial direction, the components such as piezoelectric element or weight can be sandwiched and pressed in the state of being accurately adjusted with a predetermined preload, thus enabling to make output characteristics or detection sensitivity stable. Furthermore, since the stopper ring is fixed to the tubular portion by caulking, metal chips prone to be a cause of short circuit of a sensor are not produced.

In addition, although an annular groove part is formed on the tip outer circumferential surface of the tubular portion, it is not always limited to the annular groove part. It is also preferable that a concave groove part is formed only in the region of being fixedly caulked on the tip outer circumferential surface of the tubular portion.

Embodiment 2

Figure 2:
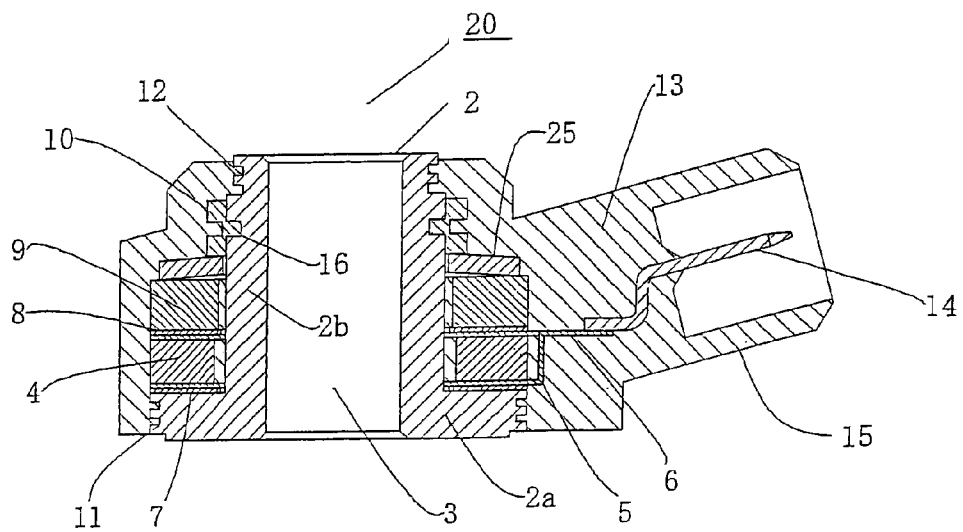
FIG. 2 is a cross sectional view of a knock sensor 20 showing a second embodiment of the invention.

Now, another embodiment is described with reference to FIG. 2. FIG. 2 is a cross sectional view of a knock sensor 20 showing a second embodiment of the invention. This second embodiment is constructed substantially in the same manner as the above-mentioned first embodiment. However, a disc spring 25 is fitted between the stopper ring 10 and the weight 9, and the stopper ring 10 is fixedly caulked into the groove part of the tubular portion 2b in the state that components such as the weight 9 or the piezoelectric element 4 are sandwiched and pressed via the mentioned disc spring 25.

As described above, in the knock sensor according to the second embodiment, due to the fact that the disc spring is fitted between the stopper ring and the weight, it is possible to prevent a piezoelectric element from breakage even if an exceedingly large pressing load is applied suddenly; and it is also possible to make the vibration of the weight due to knocking vibration of an internal combustion engine easy to occur, thus enabling to achieve a knock sensor of higher detection sensitivity.

Embodiment 3

Figure 3:
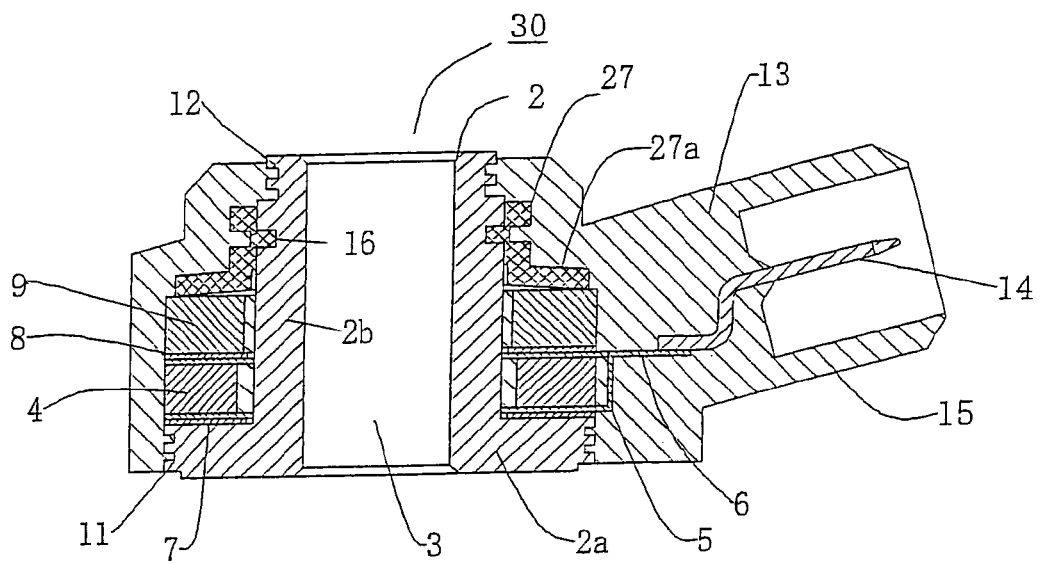
FIG. 3 is a cross sectional view of a knock sensor 30 showing a third embodiment of the invention.

FIG. 3 is a cross sectional view of a knock sensor 30 showing a third embodiment of the invention. The foregoing second embodiment is constructed such that the disc spring 25 is fitted between the stopper ring 10 and the weight 9 as a separate part. In the third embodiment shown in FIG. 3, however, a disc spring 27a is formed as an integral part with a stopper ring 27 concentrically.

Accordingly, the knock sensor according to the third embodiment enables to diminish the number of parts and further to achieve improved assembling at lower cost.

Furthermore, although the above-mentioned second and third embodiments are constructed such that components such as weight or piezoelectric element are sandwiched and pressed via a disc spring, it is not limited to a disc spring. It is also preferable that any elastic structure capable of applying a predetermined preload to the components is employed.

Embodiment 4

Figure 4:
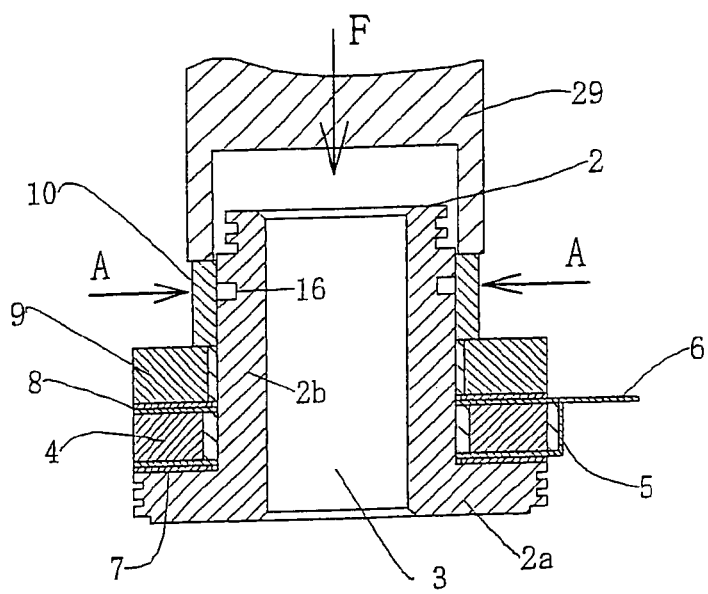
FIG. 4 is a cross sectional view showing a manufacturing method of a sensor according to the embodiment of the invention.

A manufacturing method of a knock sensor constructed as described above is described with reference to FIGS. 4 and 5, taking the knock sensor 1 according to the foregoing first embodiment as an example. As shown in FIG. 4, the base 2 of the knock sensor 1 consists of the disk-shaped flange portion 2a and the tubular portion 2b extending axially from this flange portion 2a, and provided with the through hole 3 running through both of the mentioned flange portion 2a and tubular portion 2b. The annular groove part 16 is formed at an outer circumferential surface of the tip end portion of the mentioned tubular portion 2b. To manufacture the knock sensor 1, the lower-side insulating sheet 7, lower-side terminal plate 5, piezoelectric element 4, upper-side terminal plate 6, upper-side insulating sheet 8, weight 9 and stopper ring 10 are put and fitted sequentially so as to be stacked on the mentioned flange portion 2a of the base 2.

Figure 5:
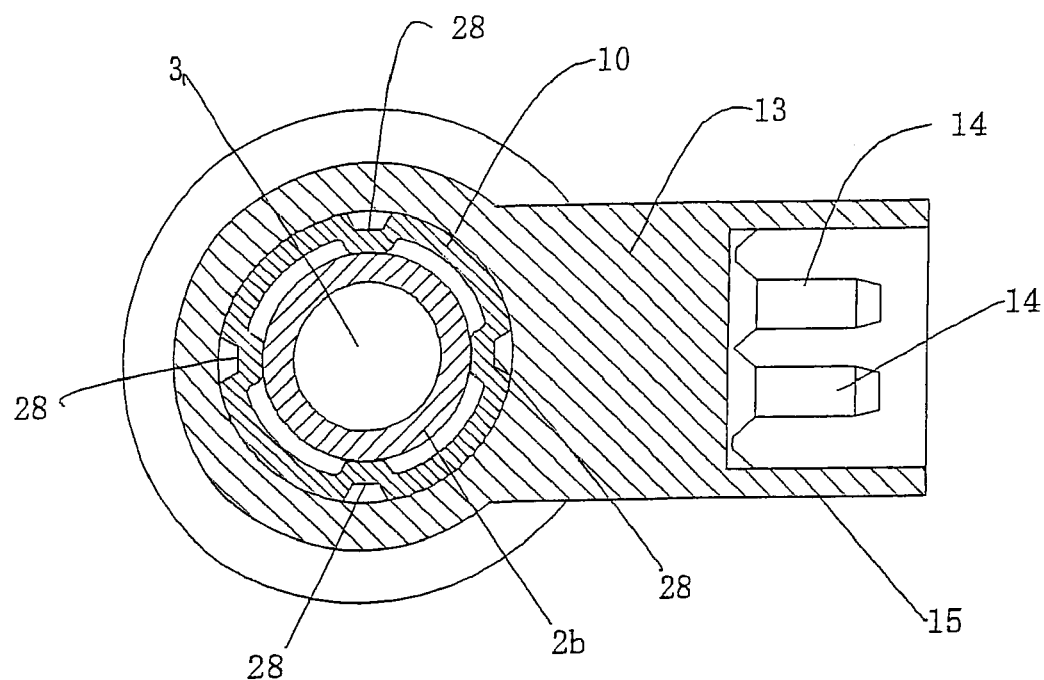
FIG. 5 is a cross sectional view taken along the line B—B of FIG. 1.
Figure 6:
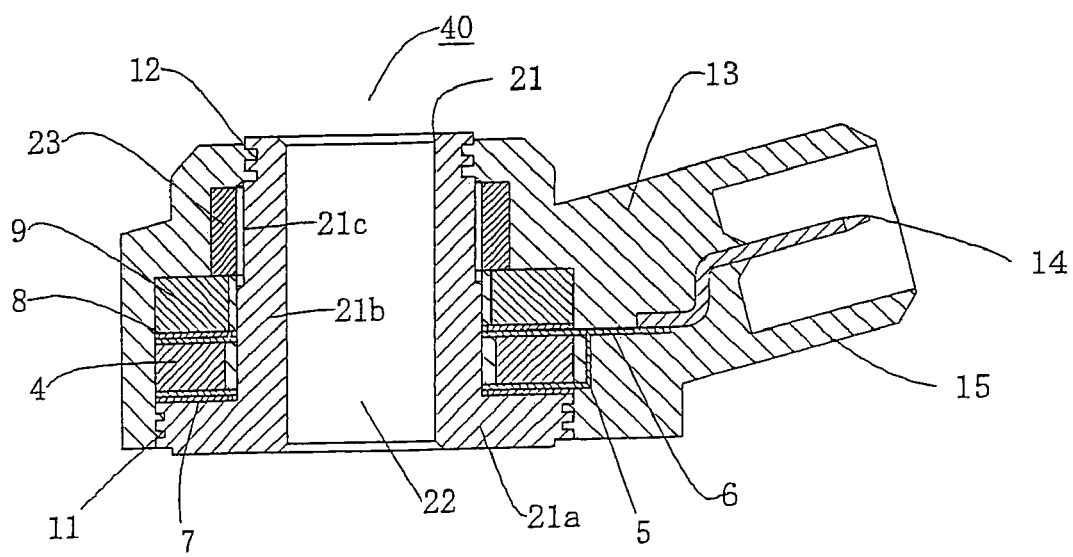
FIG. 6 is a cross sectional view of a knock sensor 40 according to the prior art.

Next, the stopper ring 10 is pressed downward while applying an external load axially to a pressing metal tool 29 via a load meter such as load cell (not shown), and this downward pressing action is stopped at a position where a predetermined load is obtained. Then, a punch (not shown) is hammered in a direction indicated by the arrow A from the side of the mentioned stopper ring as shown in FIG. 4 in the sate that the components such as piezoelectric element 4 and weight 9 are pressed. Referring now to FIG. 5 showing the caulking parts 28, the mentioned stopper ring 10 and the mentioned tubular portion 2b are fixedly caulked at four points of regions of the mentioned annular groove part 16 at substantially regular intervals, and the mentioned components are sandwiched and pressed with a predetermined load between the mentioned stopper ring 10 and flange portion 2a. Thereafter, the terminal part 14 is joined to the lower-side terminal plate 5 and the upper-side terminal plate 6 by soldering or resistance welding, and the resultant structure other than an inner circumferential surface and both end faces of the mentioned tubular portion of the base 2 is covered with a resin mold to form the case 13. Whereas, a connector part 15 for fetching out signals is formed protruding from one side face of the case 13 and is simultaneously molded with the terminal part 14 as an integral part.

In this manner, according to a manufacturing method of a knock sensor of the fourth embodiment, an external load is axially applied to the stopper ring while measuring it with a load meter such as load cell, and pressing the stopper ring downward is stopped at a position of a predetermined load being obtained. Further, in the state of being held at this position, the stopper ring and the tubular portion are fixedly caulked into the groove part from the side of the tubular portion. Therefore, it is possible to adjust a preload easily and accurately; and it is further possible that components such as piezoelectric element or weight are sandwiched and pressed with a predetermined preload, thereby enabling to make output characteristics or detection sensitivity stable.

In the method according to the above-mentioned fourth embodiment, the stopper ring and the tubular portion are fixedly caulked into the groove part formed on the outer circumferential surface of this tubular portion, in the state that an external load is applied axially to the stopper ring thereby the components such as piezoelectric element and weight being pressed to the flange portion; and the components are sandwiched and pressed between the stopper ring and the flange portion. However, it is also preferable that the stopper ring is pressed downward while applying an external load axially thereto, that an output voltage to be outputted from a piezoelectric element is measured, that pressing the stopper ring downward is stopped at a position of a predetermined voltage being obtained, and that the stopper ring is fixedly caulked into the tubular portion at the groove part in the state of being held at this position.

Furthermore, it is also preferable that the stopper ring is pressed downward while applying an external load axially to the stopper ring, that the change in electrical capacitance of the piezoelectric element is measured, that pressing the stopper ring downward is stopped at a position of a predetermined capacitance being obtained, and that the stopper ring is fixedly caulked into the tubular portion at the groove part formed on the outer circumferential surface of this tubular portion.

Additionally, the above-mentioned fourth embodiment is described taking the knock sensor according to the first embodiment as an example. Also in the case of the knock sensors according to the second and third embodiments employing a disc spring, the manufacturing method according to this invention is preferably applied. That is, the stopper ring is pressed downward while axially applying an external load, positions of the stopper ring being pressed downward is controlled to stop the stopper ring at a predetermined position by the above-described method, and the stopper ring and the tubular portion are fixedly caulked in the state that the stopper ring presses the components to the flange portion. Therefore, it is possible that the components are sandwiched and pressed accurately with a predetermined preload irrespective of spring constant of the disc spring and fluctuation in the spring constant.

Although the stopper ring and the tubular portion are fixedly caulked at four points of regions of the groove part formed on the tubular portion at substantially regular intervals in the fourth embodiment, it is not always limited to such a construction. Preferably, the stopper ring and tubular portion have to be fixed at not less than two points of regions at substantially regular intervals, or by all-round caulking (rolling caulking). In addition, a caulking configuration is not limited to that shown in FIG. 5.

While the presently detailed embodiments of the present invention have been shown and described. It is to be understood that the invention is not limited to the above-mentioned embodiments and that various changes and modifications may be made without departing from the technical scope of the invention.

What is claimed is:

1. A knock sensor comprising:
    a metal base comprising a disk-shaped flange portion and a tubular portion extending axially from said flange portion, and provided with a through hole running through both of said flange portion and said tubular portion;
    an annular piezoelectric element; a terminal plate; an insulating sheet and a weight that are fitted onto the tubular portion of said base;
    a groove part on an outer circumferential surface of said tubular portion; and
    a stopper ring which applies an axial preload to said weight disposed on said tubular portion,
    wherein said stopper ring is fixedly caulked into said groove part, such that said stopper ring has a portion, which is recessed into said groove part, with an outer diameter which is less than an outer diameter of said stopper ring at an area above or below said portion recessed into said groove part.

2. The knock sensor according to claim 1, further comprising a disc spring fitted between the stopper ring and said weight, such that said stopper ring applies an axial preload to said weight via said disc spring.

3. The knock sensor according to claim 2, wherein said stopper ring is molded integrally with the disc spring in a concentric manner.

4. A manufacturing method of a knock sensor comprising:
    fitting in sequence an annular piezoelectric element, a terminal plate, an insulating sheet, and a weight onto a base having a flange portion and a tubular portion;
    pressing downward a stopper ring while applying an external load in an axial direction;
    controlling said pressing of said stopper ring to cause said stopper ring to stop at a pre-determined position;
    caulking fixedly said stopper ring into a groove part formed on an outer circumferential surface of said tubular portion in a state that said stopper ring presses said weight towards said flange portion, such that said stopper ring has a portion, which is recessed into said groove part, with an outer diameter which is less than an outer diameter of said stopper ring at an area above or below said portion recessed into said groove part; and
    holding said terminal plates, said insulating sheet and said weight so as to be pressed between said stopper ring and said flange portion.

5. The manufacturing method of a knock sensor according to claim 4, wherein said pressing said stopper ring downward is stopped at a position of a pre-determined load which is obtained while measuring an external load in an axial direction that acts to press said stopper ring downward, and said stopper ring is fixedly caulked into said groove part in the state of being held at said position.

6. The manufacturing method of a knock sensor according to claim 4, wherein a voltage output from said piezoelectric element is measured while applying said external load in said axial direction to press said stopper ring downward, the downward pressing is stopped at a position where a predetermined voltage is obtained, and said stopper ring is fixedly caulked into said groove part in the state of being held at said position.

7. The manufacturing method of a knock sensor according to claim 4, wherein a change in electrical capacitance of said piezoelectric element is measured while applying said external load in said axial direction to press said stopper ring downward, the downward pressing is stopped at a position where a predetermined capacitance is obtained, and said stopper ring is fixedly caulked into said groove part in the state of being held at said position.

8. The manufacturing method of a knock sensor according to claim 4, wherein said stopper ring is fixedly caulked at not less than two points of regions at substantially regular intervals into said groove part.

9. The knock sensor according to claim 1, wherein said groove part is provided at a tip portion of said tubular portion.

10. The manufacturing method of a knock sensor according to claim 4, wherein said groove part is provided at a tip portion of said tubular portion.

11. The knock sensor according to claim 1, wherein said stopper ring is non-threadedly fixed to said groove part.

12. The manufacturing method of a knock sensor according to claim 4, wherein said stopper ring is non-threadedly fixed to said groove part.

13. The knock sensor according to claim 1, wherein outside diameters of the stopper ring both above and below said portion recessed into said groove part are larger than said outside diameter of said portion recessed into said groove part.

14. The manufacturing method of a knock sensor according to claim 4, wherein outside diameters of the stopper ring both above and below said portion recessed into said groove part are larger than said outside diameter of said portion recessed into said groove part.

15. A knock sensor comprising:
- a metal base comprising a disk-shaped flange portion and a tubular portion extending axially from said flange portion, and provided with a through hole running through both of said flange portion and said tubular portion;
- an annular piezoelectric element, a terminal plate, an insulating sheet and a weight that are fitted onto the tubular portion of said base;
- a groove part on an outer circumferential surface of said tubular portion; and
- a stopper ring which is caulked into said groove part to apply an axial preload to said weight.

16. The knock sensor according to claim 15, further comprising a disc spring fitted between said stopper ring and said weight, such that said stopper ring applies an axial preload to said weight via said disc spring.

17. The knock sensor according to claim 16, wherein said stopper ring is molded integrally with said disc spring in a concentric manner.

18. The knock sensor according to claim 15, wherein said groove part is provided at a tip portion of said tubular portion.

19. The knock sensor according to claim 15, wherein said stopper ring is non-threadedly fixed to said groove part.

20. The knock sensor according to claim 15, wherein said stopper ring and said tubular portion are fixedly caulked into said groove part, such that said stopper ring has a portion, which is recessed into said groove part, with an outer diameter which is less than an outer diameter of said stopper ring at an area above or below said portion recessed into said groove part.

* * * * *